(12) United States Patent
Richards et al.

(10) Patent No.: US 6,230,267 B1
(45) Date of Patent: May 8, 2001

(54) IC CARD TRANSPORTATION KEY SET

(75) Inventors: Timothy Philip Richards, Herts; David Barrington Everett, East Sussex; John Charles Viner, Windlesham, all of (GB)

(73) Assignee: Mondex International Limited, London (GB)

( * ) Notice: Subject to any disclaimer, the term of this patent is extended or adjusted under 35 U.S.C. 154(b) by 0 days.

(21) Appl. No.: 09/075,973

(22) Filed: May 11, 1998

Related U.S. Application Data

(60) Provisional application No. 60/046,514, filed on May 15, 1997.

(51) Int. Cl.7 ............................................ H06F 1/24
(52) U.S. Cl. ...................... 713/172; 713/156; 713/168; 713/176; 380/255; 380/277
(58) Field of Search ............................. 380/255, 277, 380/28; 713/156, 159, 168, 169, 172, 176

(56) References Cited

U.S. PATENT DOCUMENTS

| | | |
|---|---|---|
| 4,882,474 | 11/1989 | Anderl et al. . |
| 4,901,276 | 2/1990 | Iijima . |
| 4,949,257 | 8/1990 | Orbach .................... 364/401 |
| 5,014,312 | 5/1991 | Lisimaque et al. . |
| 5,162,989 | 11/1992 | Matsuda .................. 364/401 |
| 5,293,577 | 3/1994 | Hueske et al. . |
| 5,452,431 | 9/1995 | Bournas . |
| 5,581,708 | 12/1996 | Iijima . |
| 5,588,146 | 12/1996 | Leroux . |
| 5,682,027 | 10/1997 | Bertina et al. . |
| 5,796,831 | 8/1998 | Paradinas et al. . |
| 5,825,875 | 10/1998 | Ugon . |
| 6,012,636 * | 1/2000 | Smith ....................... 235/380 |
| 6,014,748 * | 1/2000 | Tushie et al. .............. 713/200 |
| 6,018,717 * | 1/2000 | Lee et al. ................... 705/13 |

FOREIGN PATENT DOCUMENTS

| | | |
|---|---|---|
| 0152024 | 8/1985 | (EP) . |
| 0157303 | 10/1985 | (EP) . |
| 0190733 | 8/1986 | (EP) . |
| 0218176 | 4/1987 | (EP) . |
| 0261030 | 3/1988 | (EP) . |
| 0275510 | 7/1988 | (EP) . |
| 0292248 | 11/1988 | (EP) . |
| 0325506 | 1/1989 | (EP) . |
| 0328289 | 8/1989 | (EP) . |
| 0354793 | 2/1990 | (EP) . |
| 0451936 | 10/1991 | (EP) . |
| 0466969 | 1/1992 | (EP) . |
| 0475837 | 3/1992 | (EP) . |
| 0547741 | 9/1992 | (EP) . |
| 0537756 | 4/1993 | (EP) . |
| 0540095 | 5/1993 | (EP) . |
| 0559205 | 8/1993 | (EP) . |
| 0588339 | 3/1994 | (EP) . |
| 0594493 | 4/1994 | (EP) . |

(List continued on next page.)

OTHER PUBLICATIONS

Schneler; "Applied Cryptography"; 1995 pp. 17, 33, 186, 587.*

*Primary Examiner*—Thomas R. Peeso
(74) *Attorney, Agent, or Firm*—Baker Botts L.L.P.

(57) ABSTRACT

Method and apparatus for securely transporting data onto an IC card. The method is used, for example, to transport data, including application programs, in a secure manner from a source located outside the IC card. At least a portion of the data is encrypted using the public key of a public/secret key pair of the intended IC card unit. The encrypted data is then sent to the IC card and the IC card verifies the key transformation unit using its unique secret key. The data can then be stored on the IC card. A copy of the public key signed by a certification authority can be used to verify that the card is authorized to be part of the overall authorized system.

20 Claims, 12 Drawing Sheets

FOREIGN PATENT DOCUMENTS

| | | |
|---|---|---|
| 0636998 | 2/1995 | (EP) . |
| 0647902 | 4/1995 | (EP) . |
| 0666550 | 8/1995 | (EP) . |
| 0707290 | 9/1995 | (EP) . |
| 0751460 | 1/1997 | (EP) . |
| 2536928 | 6/1984 | (FR) . |
| 2687816 | 8/1993 | (FR) . |
| 2284689 | 6/1995 | (GB) . |
| 64-81084 | 3/1989 | (JP) . |
| 2592856 | 12/1996 | (JP) . |
| WO8707062 | 11/1987 | (WO) . |
| WO8809019 | 11/1988 | (WO) . |
| WO9005960 | 5/1990 | (WO) . |
| WO9213322 | 8/1992 | (WO) . |
| 9320538 | 10/1993 | (WO) . |
| 9321612 | 10/1993 | (WO) . |
| 9522810 | 8/1995 | (WO) . |
| WO9619771 | 6/1996 | (WO) . |
| WO9628795 | 9/1996 | (WO) . |
| WO9638825 | 12/1996 | (WO) . |
| WO9843212 | 10/1998 | (WO) . |
| 9101538 | 2/1999 | (WO) . |
| WO9910824 | 3/1999 | (WO) . |
| WO9916031 | 4/1999 | (WO) . |

* cited by examiner

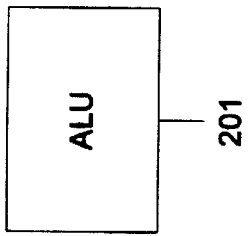
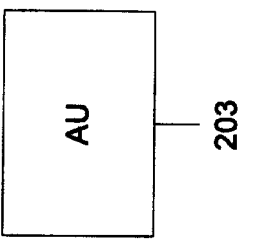
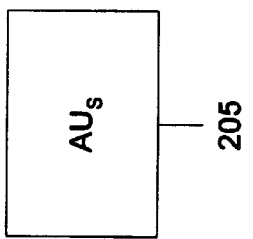
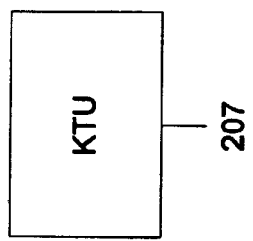
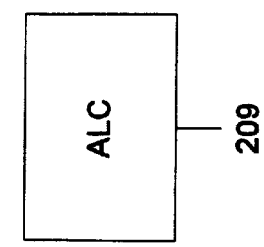
FIG 2

IC CARD TRANSPORTATION KEY SET

PRIORITY APPLICATION

This application claims priority to U.S. Provisional application No. 60/046,514 filed on May 15, 1997, and entitled "Design for a Multi Application Smart Card."

RELATED APPLICATION

This application is related to U.S. patent application No. 09/075,974 filed on May 11, 1998, entitled "Key Transformation Unit for an IC Card," and assigned to Mondex International Limited which is hereby incorporated by reference.

BACKGROUND OF INVENTION

Integrated circuit ("IC") cards are becoming increasingly used for many different purposes in the world today. An IC card (also called a smart card) typically is the size of a conventional credit card which contains a computer chip including a microprocessor, read-only-memory (ROM), electrically erasable programmable read-only-memory (EEPROM), an Input/Output (I/O) mechanism and other circuitry to support the microprocessor in its operations. An IC card may contain a single application or may contain multiple independent applications in its memory. MULTOST™ is a multiple application operating system which runs on IC cards, among other platforms, and allows multiple applications to be executed on the card itself. This allows a card user to run many programs stored in the card (for example, credit/debit, electronic money/purse and/or loyalty applications) irrespective of the type of terminal (i.e., ATM, telephone and/or POS) in which the card is inserted for use.

A conventional single application IC card, such as a telephone card or an electronic cash card, is loaded with a single application when it is manufactured and before it is given to a card user. That application, however, cannot be modified or changed after the card is issued even if the modification is desired by the card user or card issuer. Moreover, if a card user wanted a variety of application functions to be performed by IC cards issued to him or her, such as both an electronic purse and a credit/debit function, the card user would be required to carry multiple physical cards on his or her person, which would be quite cumbersome and inconvenient. If an application developer or card user desired two different applications to interact or exchange data with each other, such as a purse application interacting with a frequent flyer loyalty application, the card user would be forced to swap multiple cards in and out of the card-receiving terminal, making the transaction difficult, lengthy and inconvenient.

Therefore, it is beneficial to store multiple applications on the same IC card. For example, a card user may have both a purse application and a credit/debit application on the same card so that the user could select which type of payment (by electronic cash or credit card) to use to make a purchase. Multiple applications could be provided to an IC card if sufficient memory exists and an operating system capable of supporting multiple applications is present on the card. Although multiple applications could be preselected and placed in the memory of the card during its production stage, it would also be beneficial to have the ability to load and delete applications for the card post-production as needed.

The increased flexibility and power of storing multiple applications on a single card create new challenges to be overcome concerning the integrity and security of the information (including application code and associated data) exchanged between the individual card and the application provider as well as within the entire system when loading and deleting applications. It would be beneficial to have the capability in the IC card system to exchange data among cards, card issuers, system operators and application providers securely and to load and delete applications securely at any time from a local terminal or remotely over a telephone line, Internet or intranet connection or other data conduit. Because these data transmission lines are not typically secure lines, a number of security and entity authentication techniques must be implemented to make sure that applications being sent over the transmission lines are not tampered with and are only loaded on the intended cards.

As mentioned, it is important—particularly where there is a continuing wide availability of new applications to the cardholder—that the system has the capability of adding applications onto the IC card subsequent to issuance. This is necessary to protect the longevity of the IC cards; otherwise, once an application becomes outdated, the card would be useless. It would be beneficial to allow the addition of applications from a remote location as well as from a direct connection to an application provider's terminal. For example, it would be beneficial for a card user to be able to plug his or her IC card into a home computer and download an application over the Internet. This type of remote loading of applications raises a number of security risks when transmitting the application code and related data over an unsecured communications line such as the Internet.

An entity which transmits an application or data to an IC card requires that only the intended IC card should receive the transmitted data. Third parties should not be able to intercept and view the data. Additionally, a transmitting entity will require verification that the IC card which has requested information is actually part of the overall IC card system and not simply posing as being part of the system. These concerns are raised by both remote application loading as well as local terminal application loading.

Accordingly, it is an object of this invention to provide a secure transfer technique and specifically to provide a secure IC-card system that allows for the secure transfer of data including smart card applications which may be loaded onto IC cards.

SUMMARY OF THE INVENTION

These and other objectives are achieved by the present invention which provides an IC card method and apparatus for securely transporting data including an application onto an IC card including storing a secret and public key pair on the IC card, retrieving the stored public key from the IC card, encrypting at least a portion of the data to be transported using the public key, transmitting the encrypted data to the IC card and decrypting the encrypted data using the IC card's secret key.

In a preferred embodiment, a certification authority ("CA") or the entity that manages the overall security of the IC card system, encrypts (or digitally signs) a copy of the IC card's public key and the signed copy is also stored on the IC card. The entity transmitting the data to the IC card can verify that the CA has approved the card by retrieving using the IC card's signed public key and verifying the signed public key using the public key of the CA. If verification is successful, the entity has verified that the CA approved the IC card.

BRIEF DESCRIPTION OF THE DRAWINGS

Further objects, features and advantages of the invention will become apparent from the following detailed description taken in conjunction with the accompanying figures showing illustrative embodiments of the invention, in which

FIG. 2 is a graphic representation of the contents of an Application Loading Unit;

Figure 1A:
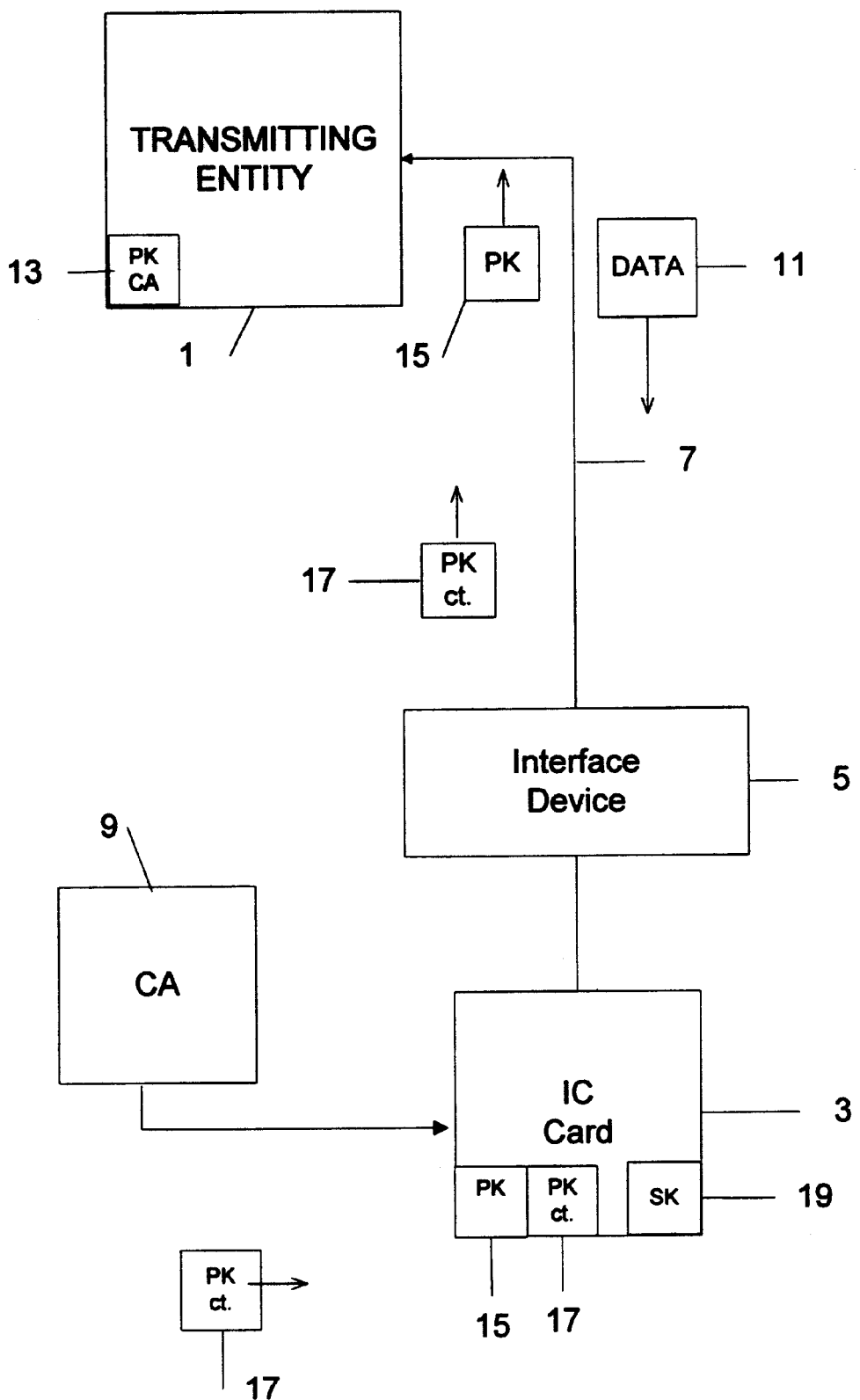
FIG. 1A is a block diagram of the secure data transfer system which securely transfers data from a transferring entity to an IC card.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE INVENTION

It is beneficial to have the capability to load applications onto IC cards containing multiple application operating systems at any time during the lifetime of the IC card. This flexibility allows a user of a card to periodically add new applications to the IC card and also allows older applications to be updated with newer versions of the application when they are released. For example, a card user may start with an IC card that contains a purse, or electronic cash application (e.g., MONDEX™), being stored on his IC card. Some time after the user has the card, he or she may load an additional application onto the card such as a credit/debit application. Some time after loading the credit/debit application on the card, a new version of the credit/debit application may become available and the card user should be able to erase the old application on his IC card and replace it with the new version of the credit/debit application which may contain additional features. Additionally, an IC card needs to receive data regarding personal information such as new credit card account numbers or updated information.

The flexibility of loading applications and transmitting data at different times during the IC card's life cycle creates security issues with the process of loading applications onto the card. In a multiple application operating system environment, it is beneficial to be able to load applications and data both at terminals, such as a bank ATM machine, as well as over remote communication links, such as telephone lines, cable lines, the Internet, satellite or other communications means. When loading applications and data onto an IC card, the application provider needs to provide security regarding the applications to be loaded. First, the application provider must make sure the application is only sent to the correct card user who is intended to receive the application. Second, the application and associated data may contain private or trade secret information which needs to be encrypted so entities other than the IC card cannot view the contents of the encrypted application code and data. A portion of the application code and data may be secret while other portions are not. These concerns of authentication and protecting the contents of some or all of the application and associated data being loaded onto a card is addressed herein.

A number of encryption/decryption techniques are described herein. There are two basic types of encryption, symmetric encryption and asymmetric encryption. Symmetric encryption uses a secret key as part of a mathematical formula which encrypts data by transforming the data using the formula and key. After the data is encrypted, another party can decrypt the encrypted data using the same secret key with a decryption algorithm. Thus the same key is used for encryption and decryption so the technique is symmetric. A conventional example of a symmetric algorithm is DES.

Asymmetric encryption techniques use two different keys of a pair for encrypting and decrypting information. The two keys are normally referred to as a private or secret key and a public key. When data is encrypted with one key of the pair, the other key is used to decrypt the data. If a sender of data signs the data with his secret key, anyone with the public key can verify the message. Since public keys are typically known to the public, the contents of a data signed with a secret key cannot be protected but the origination of the data can be verified by determining if a particular secret key signed the data. This authentication process is termed a digital signature. If person A wanted to authenticate a message he was sending to person B, the person A would sign the document with his secret key. When person B received the message, he would use person A's public key to verify the message. If the message was verified with the public key, person B would know that the document was signed with secret key of person A. Thus, the origin of the message has been authenticated.

The asymmetric key set can also be used to protect the contents of a message. If person A wanted to send an encrypted message to person B that no one else could read, he would encrypt the data or message with person B's public key and send it to person B. Now only the holder of B's secret key could decrypt the data. If a combination of keys is used, a person could both authenticate and encrypt the message. The asymmetric pair of keys has some powerful applications with respect to card security. However, asymmetric encryption is relatively processor costly (processor cost is associated with computation time) compared with symmetric encryption. An example of asymmetric encryption method is RSA®.

A hybrid of symmetric encryption which makes the encryption method more powerful is to encrypt data using two symmetric keys. This technique is called triple DES which encodes data with key 1, decodes the data using key 2 (which in effect further encodes the data) and then further encodes the data using key 1 again. Once the data has arrived at its destination, key 1 is used to decode the data, key 2 is used to encode the data, and key 1 is used to decode the data.

These extra steps of encoding and decoding make the technique more powerful and more difficult to properly decipher without both keys.

FIG. 1A shows a block diagram of the entities used in transporting data in a secure manner in an IC card system. The transmitting entity 1 can be a card issuer, bank, IC card or other entity which desires to transport data to an IC card 3. The transmitting entity 1 preferably initiates the data transfer process. Alternatively, the IC card 3 can initiate the data transfer process if the card requires data from the transmitting entity 1.

The transmitting entity 1 is connected to interface device 5 (e.g., a terminal that communicates with an IC card). Data conduit 7 can be a telephone line, an intranet, the Internet, a satellite link or any other type of communications link. In this example, the transmitting entity 1, which is remotely located from IC card 3, desires to send data in a secure manner to the IC card. However, because the data link is an "open" link (i.e. not a private link) and subject to third parties possibly intercepting or replacing data being transmitted, security measures are needed to guarantee that only the intended IC card will receive the transmitted data. The Certificate Authority 9 can also be used to authenticate that the IC card has been validated as part of the IC card system.

In FIG. 1A, a private (or secret) key 19 and corresponding public key 15 is generated for IC card 3. The keys are preferably generated using an asymmetric encryption algorithm such as RSA®. The keys can be generated at the CA 9 or any other location because they are specific only to the IC card 3 and no other copies need to be kept. A third data item, the public key certificate 17, is also generated and stored on the IC card 3.

The public key certificate 17 is generated by signing the public key 15 with the private key of the CA 9. This allows a person with the public key of the CA 9 to verify that the CA digitally signed the IC card's public key in order to certify the IC card's individual key set. The public key certificate can be generated by the CA at the time the IC card private/public key set is generated or at a subsequent time.

When a data transfer is initiated by the transmitting entity 1, the IC card 3 is contacted through the interface device 5 and the IC card 3 sends its public key 15 and its public key certificate 17 to the transmitting entity 1. The transmitting entity then verifies the public key certificate with public key of the CA 13 (which is publicly available from the CA 9 and may be stored in the transmitting entity 1) thus determining if the CA 9 digitally signed the public key and verifying that the IC card is a valid card.

The transmitting entity 1 then encrypts the data to be transmitted with the IC card's public key. The transmitting entity 1 then transmits the encrypted data 11 to the interface device 5 and to the IC card 3. The IC card 3 decrypts the encrypted data with its corresponding private (also called secret) key 19. The data can then be processed by the IC card 3. Only the IC card 3 has a copy of its private key so only the intended IC card can access the encrypted data. This ensures that third parties cannot access the encrypted data and correspondingly that only the intended IC card will be able to read and process the data.

Figure 1B:
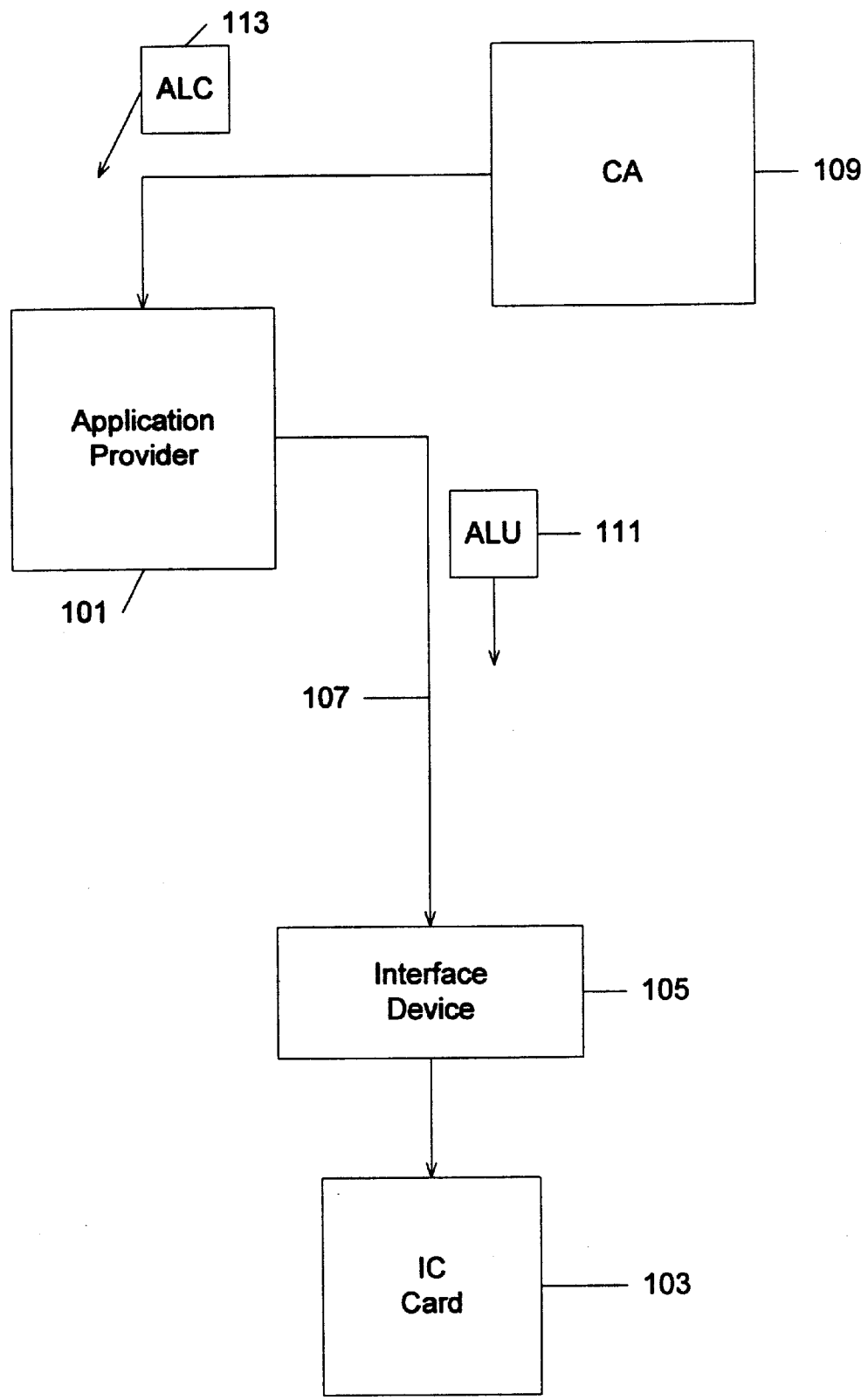
FIG. 1B is block diagram of the application loading system which loads an application from an application provider to an IC card.

FIG. 1B shows a secure method for loading applications onto an IC card. FIG. 1B shows a block diagram of the entities used in a secure remote application loading process. The application provider 101 can be a card issuer, bank or other entity which provides application loading services. The application provider 101 initiates an application loading process onto IC card 103. IC card 103 is connected to data conduit 107 which is connected to interface device 105 (e.g., a terminal that communicates with an IC card). Data conduit 107 can be a telephone line, an intranet, the Internet, a satellite link or any other type of communications link. The application provider 101, which is remotely located from the IC card 103, desires to send and load an application to the IC card. However, because the data link is an open link and subject to third parties possibly intercepting or replacing applications being transmitted, security measures which authenticate the application itself, the application provider and the IC card must be used to ensure the integrity of the system. The CA 109 may also be used to help authenticate that some data being transferred is part of an identified system.

In FIG. 1B, the application provider sends an application load unit 111 to the interface device 105 and finally to IC card 103. The ALU includes the application itself and security data required to authenticate and protect the application code and associated data. The ALU is discussed specifically in FIG. 2 and in connection with the other figures herein. The ALU 111 also preferably contains Application Load Certificate (ALC) 113 data which is sent from the Certification Authority (CA) 109 to the application provider 101. The Certification Authority manages the overall security of the system by providing an Application Load Certificate for each application which is to be loaded onto an IC card. The application provider 101 and the IC card 103 both have individual public/secret keys sets. The authentication and security processes will now be described.

FIG. 2 shows a diagram illustrating the components of an Application Load Unit which is sent from the application loader to the IC card during the application load process. The Application Load Unit (ALU) 201 contains an Application Unit (AU) 203, an Application Unit Signature ($AU_s$) 205, a Key Transformation Unit (KTU) 207 and an Application Load Certificate (ALC) 209. The ALU 201 is formatted in a conventional format used during data transmission. AU 203 contains the application code and data which are to be stored on the IC card, some or all of which is encrypted to protect a secret portion or portions of the code and/or data. AU 203 is described in further detail in connection with FIG. 3.

$AU_s$ 205 is the application code and data AU 203 digitally signed with the secret key of the application provider. The public key of the application provider is sent as part of the ALC 209 and is used to authenticate the application provider as the originator of the application. ALC 209 is made up of card identification information and the application provider's public key and is signed by the secret key of the certification authority. All these elements will be described in more detail below.

KTU 207 contains information relating to the encryption of the AU 203 (the code and data of the application) which allows the IC card to decrypt the designated portions so that the application and data can be accessed by the IC card but protects the data during transmission between the application provider and the IC card. KTU 207 is encrypted with the public key of the IC card for which the application is intended which ensures that only the intended IC card can decrypt the application code and data using the KTU information. This element will be described in connection with FIG. 5.

Figure 3:
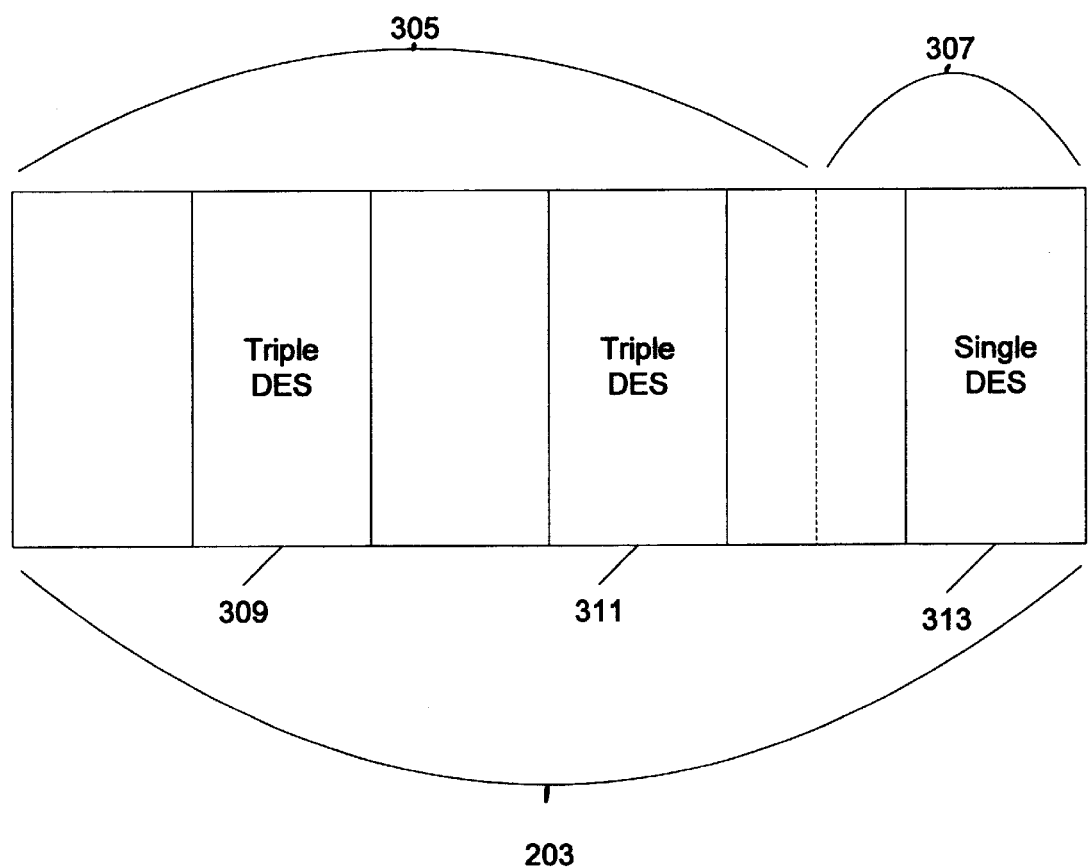
FIG. 3 is a graphic representation of an Application Unit.

FIG. 3 shows a graphic representation of the Application Unit 203 which is part of the application load unit. The AU 203 contains both the program code and associated data which is to be loaded onto the IC card of the card user. The program code consists of a number of program instructions which will be executed by the microprocessor on the IC card. The program instructions can be written in any programming language which the operating system stored on the IC card can interpret.

For example, in the MULTOS system the program can be written in MEL™ (MULTOS Executable Language). Most applications have associated data which must be loaded onto the card. For instance, data which identifies the card user such as a person's name or account number may be loaded in a secure manner with the credit/debit application. An application provider may provide electronic cash represented by data as a promotion when installing an electronic purse application. Some or all of this data is desired to be kept secret from third parties. Additionally, the application code itself may be considered proprietary and portions may be desired to be kept secret from others. The use of a Key Transformation Unit (KTU) will allow an application provider to designate and encrypt selected portions of its application as confidential and protect it from third parties.

Application Unit portion 305 indicates the program code which is to be transferred from the application provider to the IC card. Application Unit portion 307 indicates the associated data which is to be transferred as part of the application to be loaded onto the IC card. In this example, three discrete areas of the application unit are shown to be encrypted using either single DES or triple DES. Any number of variations regarding the portions encrypted and the type of encryption can be employed using the techniques described herein.

In this example, encrypted location 309 shows the first portion of the Application Unit 203 which has been encrypted using a triple DES technique. The encryption process as described above involves using a symmetric key and the conventionally known DES-based algorithm to transform the data. The data can later be recovered by applying the key to a conventionally known DES-based decryption algorithm. Encrypted location 311 shows a second portion of the application unit 203 which has been encrypted using triple DES. Encrypted location 313 shows a third portion which is encrypted using single DES. Single DES requires less computation to decrypt and takes up less space as part of the KTU as described below. If the application unit were intercepted by a third party while it was being transmitted from the application loader to the IC card, the encrypted portions could not be read unless the third party had the correct keys and decryption algorithm. That information, therefore, is protected in the KTU.

The KTU is used to allow the IC card for which the application and associated data is intended to decrypt the encrypted portions of the Application Unit by describing which portions of the application unit are encrypted, which encryption algorithm was used and the key or keys to be used to decipher the text. This information is highly confidential between the application provider and the intended IC card and therefore is protected in a manner unique to the intended card. In order to encrypt the KTU which is part of the overall ALU being transmitted, an individual key set for the particular intended IC card is used. The key set and its generation will now be described.

Figure 4:
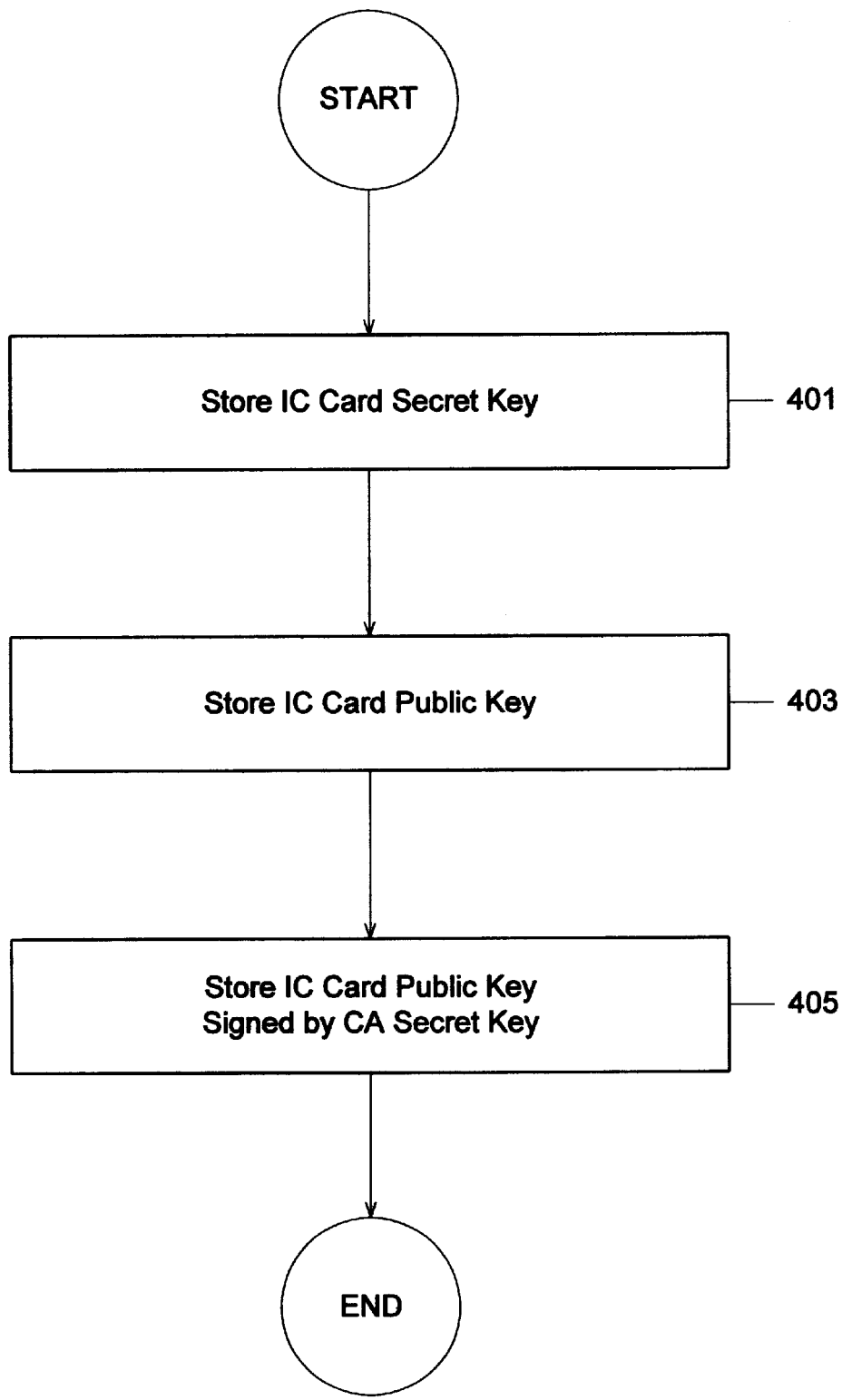
FIG. 4 is a flow chart of the steps for providing an individual key set for an IC card.

In accordance with the present invention, one of the security operations performed at the CA is to generate an individualized key set for each IC card which is stored on the card. The keys are used for off-card verification (i.e., to verify that the card is an authentic card) and for secure data transportation. The key generation process is shown generally in FIG. 4. The key set is made up of three different key data items: the card's secret key which is known only to the card, the card's public key which is stored on the card and the card's public key certificate which is the card's public key signed by the CA's secret key. The individual keys of the key set are described in more detail below.

Step 401 stores a card specific transport secret key for the individual IC card in the memory of the card. This secret key is generated by the CA from a standard asymmetric encryption technique such as RSA® and loaded onto the card via a card acceptance device. Once stored on the card, the CA deletes from its own memory any data relating to the secret key. Thus, only the card itself knows its secret key. The data element containing the secret key information in the card is called "mkd_sk" which stands for MULTOS key data secret key.

Step 403 stores a card specific transport public key for the individual IC card in the memory of the card. This public key is preferably generated by the CA from the asymmetric encryption technique used to produce the secret key in step 401. As with the secret key, once the public key is stored on the card, the CA (or other key provider) deletes from its systems the public key data so that the only copy of the public key is kept in the card. The data element containing the card's public key information is called "mkd_pk" which stands for MULTOS key data public key.

Step 405 stores a card specific transport public key certificate for the individual IC card in the memory of the card. The data element containing the card's public key certificate information is called "mkd_pk_c" which stands for MULTOS key data public key certificate. This public key certificate is preferably generated by signing the transport public key mkd_pk with the secret key of the CA, indicated as follows:

$$mkd\_pk\_c=[mkd\_pk]_{CA\_sk}$$

which means the individual card's public key certificate is formed by applying the CA's secret key to the individual card's public key. The process is carried out at the CA. The public key certificate is retained by the CA so that it can regenerate the public key as needed.

A terminal can read the public key certificate from the IC cards to verify that the CA had signed and therefore approved the individual IC card. This is accomplished by verifying the public key certificate with the public component of the CA key set used to sign the mkd_pk.

Figure 5:
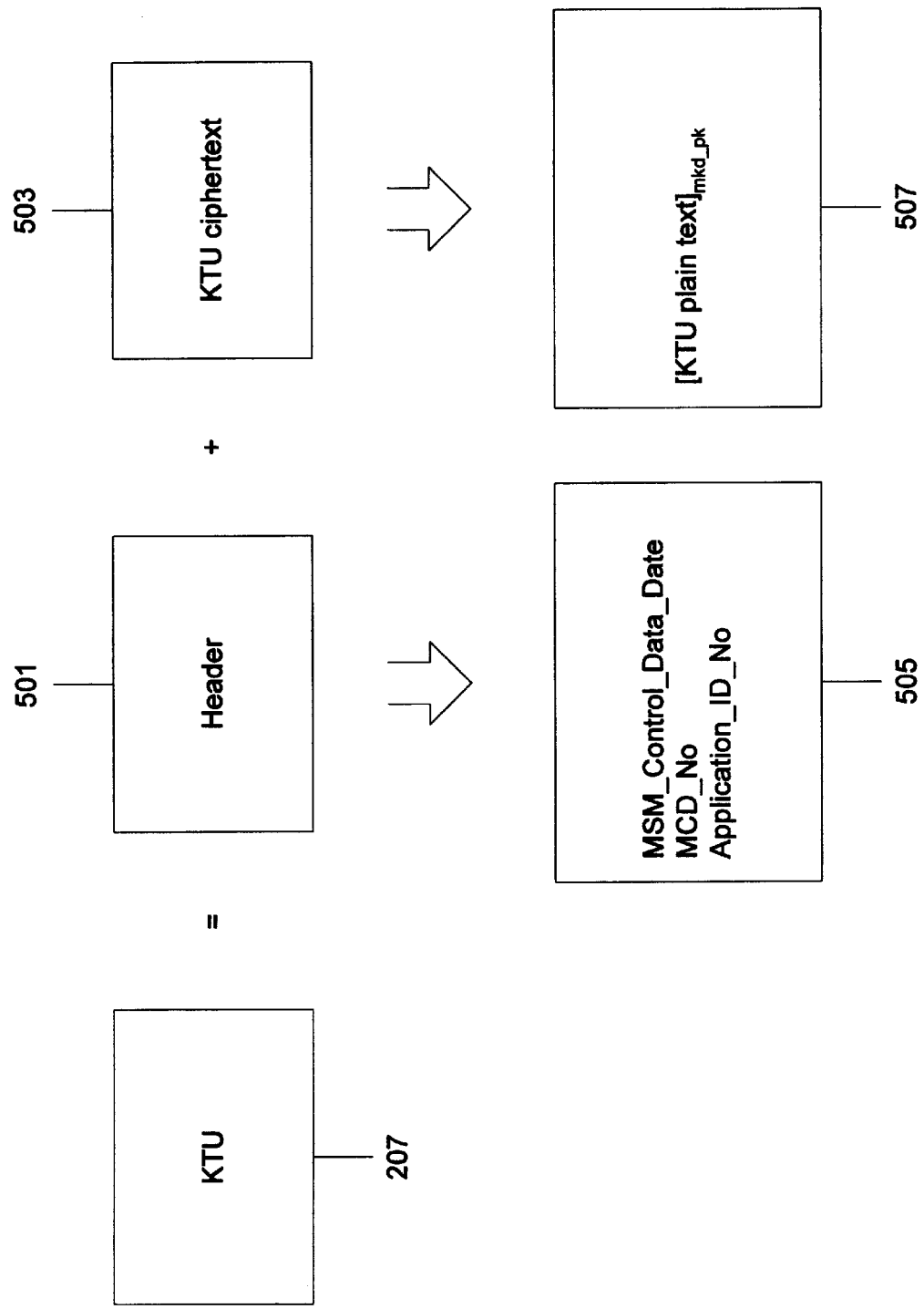
FIG. 5 is a graphic representation of a Key Transformation Unit.

FIG. 5 is a graphic depiction of the contents of KTU 207, which contains Header portion 501 and KTU Ciphertext portion 503. As shown in FIG. 5, header information 501 includes, for example, identifier or permissions information 505 such as the application_id_no (application identification number), mcd_no (IC card no) and/or msm_control_data_date (the date the IC card was issued). Additional identifiers could also be included. These identifiers allow the system to verify that the IC card which receives the ALU is the intended IC card. The permissions data is discussed in detail in the above referenced related application.

KTU Ciphertext 503 corresponds to KTU Plaintext (not encrypted) encrypted with the public key mkd_pk of the intended IC card as shown in box 507. The KTU Plaintext in farther described in FIG. 6. The public key mkd_pk is obtained from the intended IC card by the application provider. The public key of an IC card is freely available to anyone and can be obtained directly from the card or from the CA. By encrypting the KTU Plaintext with the IC card public key, only the intended IC card can use its secret key of the public/secret key pair to decrypt the KTU Ciphertext. This means that only the intended IC card can determine the contents of the KTU plaint text, identify the encrypted portions of the application being loaded and use the keys to decrypt and recover the entire application and associate data. Because no other entity has the secret key of the IC card, the security and integrity of the program code and data being transmitted in ensured.

Figure 6:
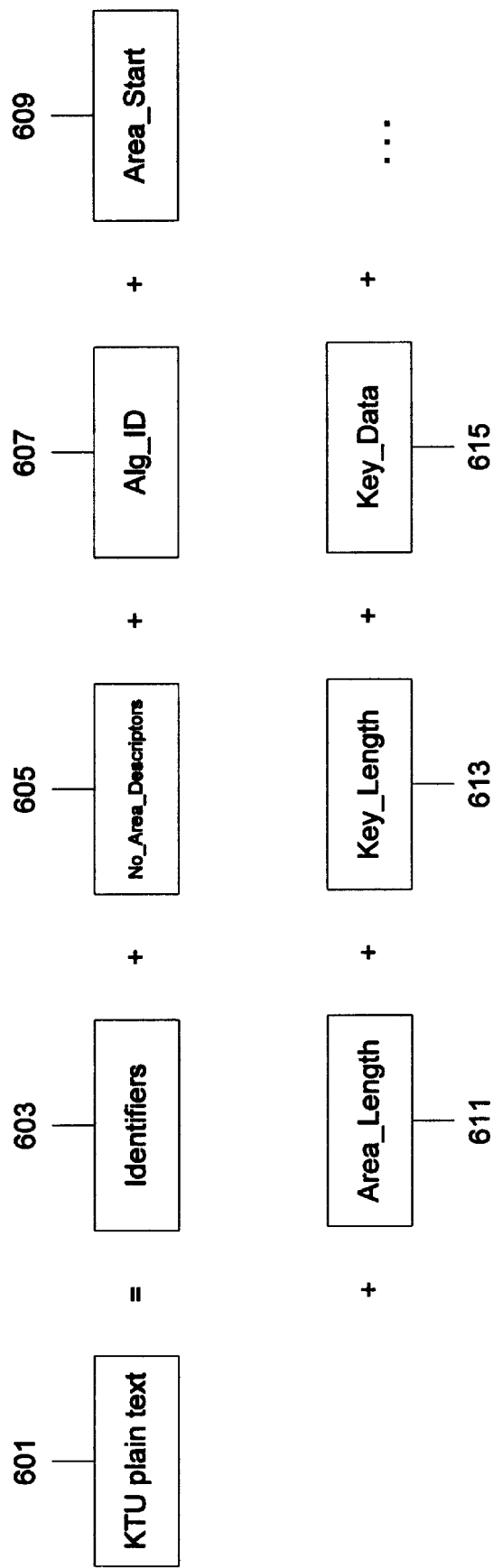
FIG. 6 is a graphic representation of a Key Transformation Unit plaintext.

FIG. 6 is a graphic representation of KTU Plaintext 601. KTU Plaintext 601 preferably includes identifier field 603, no_area_discriptors field 605, alg_id field 607, area_start field 609, area_length 611, key_length field 613, key_data field 615 and additional area and key fields depending upon the number of encrypted areas present in the Application Unit. Identifiers 603 contain identifying information of the Application Unit to which the KTU applies. No_area_descriptors 605 indicates how many different portions of the AU have been encrypted. In the example of FIG. 3, the number or area descriptors would be three. Field 607 contains the algorithm identifier for the first area which has been encrypted. The algorithm could be DES or triple DES, for example. Field 609 indicates the start of the first encrypted area. This indication could be an offset from the start of the AU. For example, the offset could by 100 which means that the first area starts at the $100^{th}$ byte of the Application Unit. Field 611 indicates the area length for the first encrypted portions. This field allows the microprocessor on the IC card to know how large an area has been encrypted and when coupled with the start of the area, allows the IC card microprocessor to decrypt the correct portion of the Application Unit. Filed 613 indicates the key length for the particular encrypted portion of the application unit. The length of the key will differ for different encryption techniques. The key length field allows the IC card to know the length of the key data Field 615 indicates the key data for the particular encrypted portion. The key data is used with the algorithm identity and the location of the encoded portion to decode the encrypted portion. If more than one encrypted area is indicated, then additional data referring to the algorithm, start location, length, key length and key data will be present in the KTU Plaintext. While a number of fields have been described, not all the fields are necessary for the invention. The most important field, however, is the key data itself.

Figure 7:
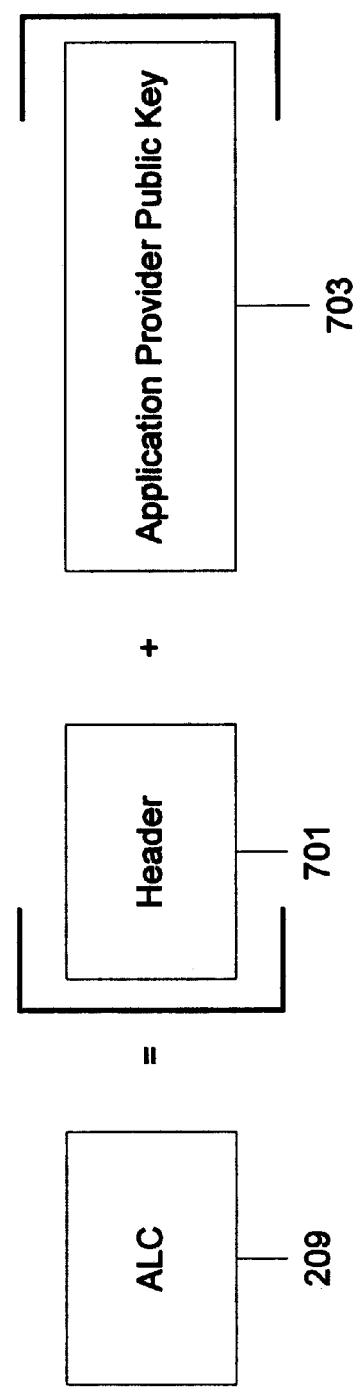
FIG. 7 is a graphic representation of the Application Load Certificate.

FIG. 7 is a graphic representation of the Application Load Certificate (ALC) 209. ALC 209 includes a header 701 and the Application Provider Public Key 703. Header 701 and Application Provider Public Key 703 are then signed (encrypted) with the CA secret key. Thus, the ALC 209 must be provided by the CA to the application provider for each application loaded because only the CA knows the CA private key. Header 701 contains information regarding the application provider and the IC card for which the application is intended. The ALC 209 is placed in the correct ALU by the application provider which can use the identification information. Application Provider Public Key 703 is provided to the CA along with the identification data. The CA then signs this information after verifying its authenticity and returns the signed ALC to the application provider. The IC card, when it receives the ALC 209 as part of the ALU 201, will verify the ALC 209 with the public key of the CA. This ensures that the CA signed the Application Load Certificate and that it is genuine. After verifying the information, the header identification information 701 is checked and the application provider public key is recovered. This public key will be used to verify that the application and code which is to be loaded onto the IC card originated with the proper application provider.

Figure 8:
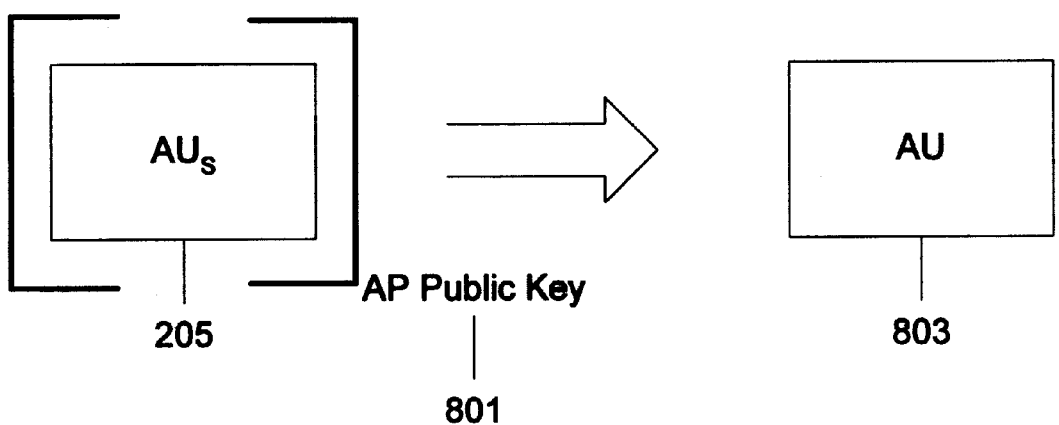
FIG. 8 is a graphic representation of the Application Unit being decrypted.

FIG. 8 is a graphic representation of the use of the application provider's public key to verify the signature of the AU 205 in order to verify that AU 203 was signed by the application provider. AU signature 205 is verified with the Application Provider Public Key 801 and compared with AU 203. If the data blocks match, then the IC card has verified that the application provider signed (encrypted) the application unit and the application is genuine. This authentication is valid because only the application provider has its own secret key. The IC card can process this information efficiently because the application provider's public key is provided to it as part of the Application Load Certificate 209 which is signed by the CA. Therefore, it does not need to retrieve the public key from an external location to authenticate the application.

Figure 9:
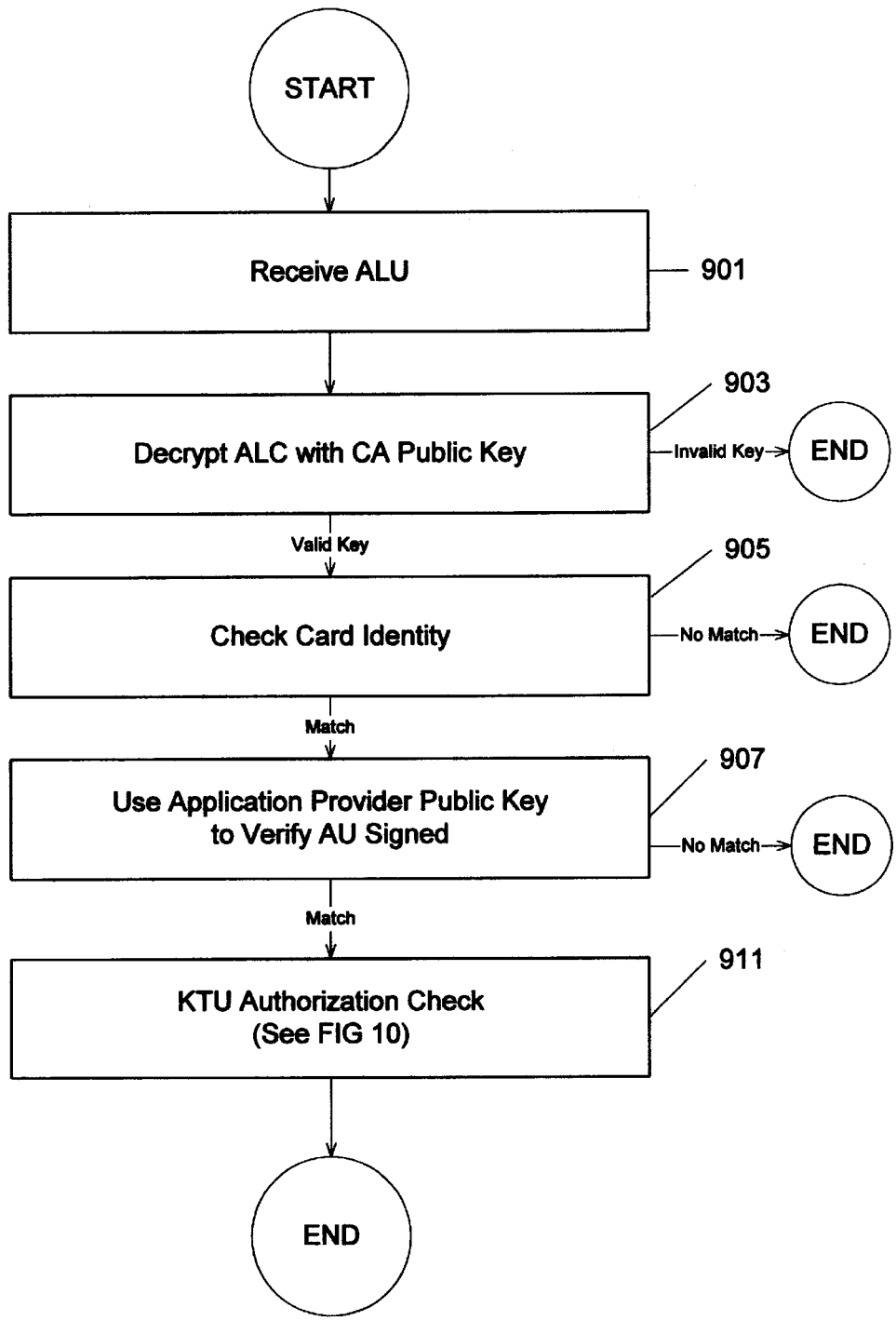
FIG. 9 is a flowchart illustrating the steps undertaken in processing the Application Load Unit.

FIG. 9 shows a flow chart of the steps for processing the Application Load Unit when it is received by the IC card. Prior to receiving the ALU, identity checks as to the identity of the IC card can be performed if desired. The ALU processing techniques provide a number of further verifications including verifying that the application being loaded is: (1) from the correct application provider, (2) being loaded on the intended card and (3) certified by the CA. The ALU processing techniques also allow the transportation of transport decryption keys which enable the IC card to decrypt portions of the program code and associated data in a secure manner. In step 901, the IC card receives the ALU from the application provider. The ALU can be transmitted via a terminal connection, contactless connection, telephone, computer, intranet, Internet or any other communication means. The ALU is placed in an I/O buffer of the IC card along with header information indicating the starting addresses of AU 203, AU signed 205, the KTU 207 and ALC 209. Alternatively, the IC card could determine the relative address locations of these four units.

Step 903 verifies the ALC 209 with the CA public key. Each IC card preferably stores in its memory a copy of the CA public key because it is used in many transactions. Alternatively, the IC card could obtain the public key from a known storage location. If the CA public key verifies the ALC 209 properly, then the IC card has verified that the CA has signed the ALC 209 with its secret key and thus the Application Load Certificate is proper. If the IC card cannot verify the ALC properly, then the ALC was not signed by the CA and the certificate is not proper. The application loading process would then end.

Step 905 then checks the identity of IC card against the identification information sent in the Application Load Certificate to make sure the card is intended to receive the application. This permissions checking is described in the related patent application identified above. If there is no match of identification data, the application loading process ends. If the identification data does match, then the process continues.

Step 907 uses the application providers public key which was recovered from the verified ALC to verify AU signature 205. When the ALU was generated by the application provider, the application unit 203 was signed with the application provider's secret key to authenticate that the application was provided by the correct application provider. The application provider then provides its public key to IC card through the ALC. The IC card then verifies the AU signature 205. If the two data blocks match, then the ALU is verified as being generated by the application provider. Because the application provider's public key is part of the ALC which is signed by the CA, the CA can make sure that the proper public key has been provided to the IC card. This unique key interaction between the application provider, CA and the intended IC card ensures that no counterfeit or unapproved applications or data are loaded onto an IC card which is part of the secure system.

Step 911 then processes a KTU authentication check which further verifies that only the intended card has received the application. The KTU authentication check makes sure that if a third party does somehow intercept the ALU, the third party cannot read the enciphered portions of the AU and cannot retrieve the keys to decrypt the AU. This step is further explained in FIG. 10.

Figure 10:
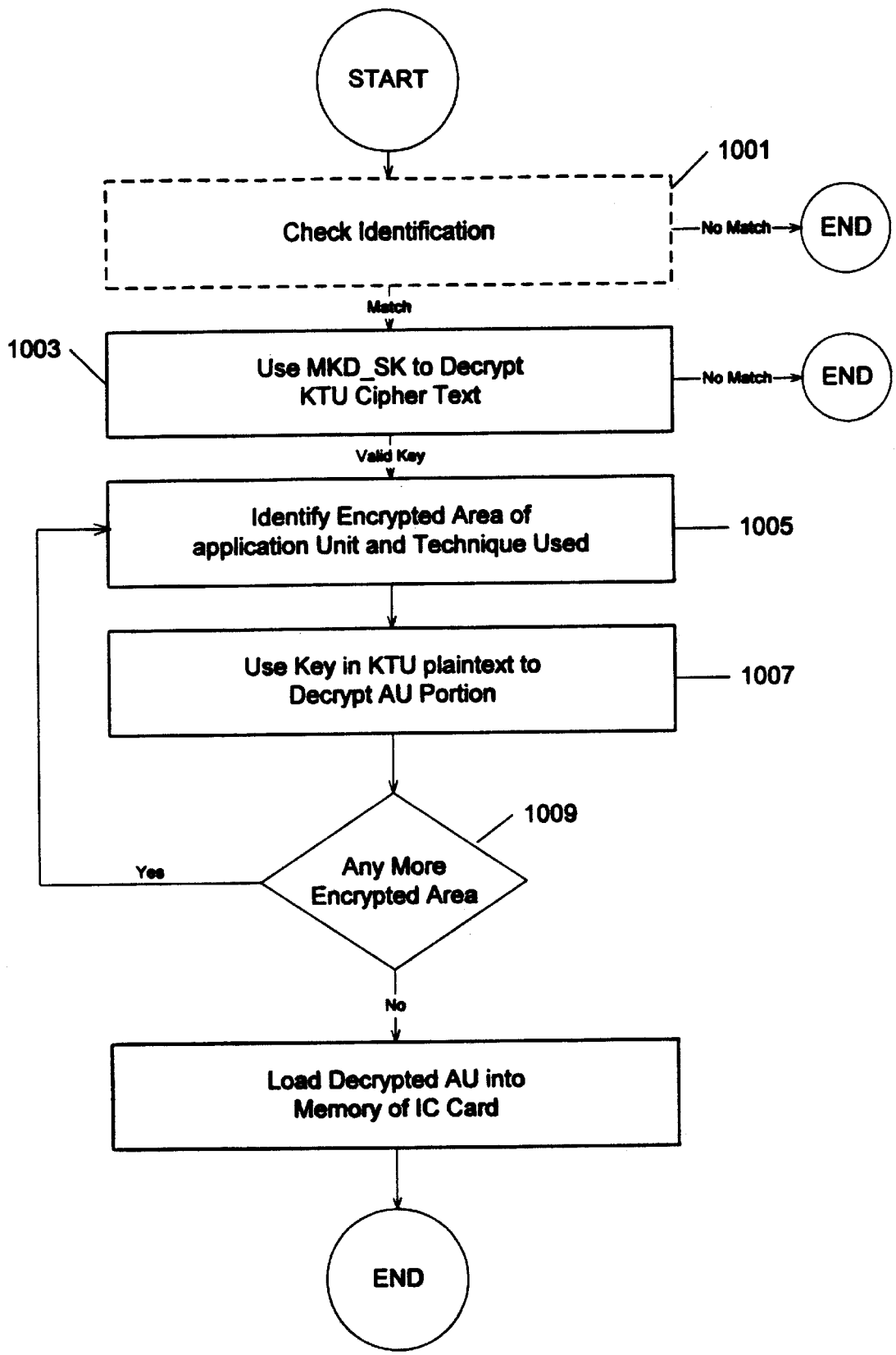
FIG. 10 is a flowchart illustrating the steps undertaken in processing the KTU.

FIG. 10 shows the steps of the KTU Authentication process. Step 1001, which is shown in dashed lines because it is preferably optional, checks the identification of the IC card a second time. The identification information can be sent as part of the KTU data. However, this check is optional as it has already been performed once in step 905.

Step 1003 then decrypts KTU ciphertext 503 using the IC card's secret key (mkd__sk). The KTU Plaintext was previously encrypted using the intended card's public key (mkd__pk). This means that only the holder of the intended card's secret key could decrypt the encrypted message. The application provider obtains the intended IC card's public key either from the IC card itself (See FIG. 4 and related text for a discussion of the mkd key set) or from a database holding the public keys. If the IC card cannot decrypt the KTU ciphertext properly then the KTU is not meant for that card and the application loading process halts. If the IC card does properly decipher the KTU ciphertext, then the process continues.

Step 1005 identifies an encrypted area of the application unit (AU). In the example of the KTU Plaintext described in connection with FIG. 6, the IC card uses a relative starting address and area length field to determine the encrypted portion. Step 1005 also identifies which encryption technique was used to encrypt the identified portion so that the proper decryption technique can be used. For example, the technique could by single or triple DES. Alternatively, the technique could be a default technique used in the system and need not be identified.

Step 1007 then retrieves the key from KTU Plaintext and decrypts the identified portion with the identified decryption technique. This allows the IC card to have the decrypted portion of the AU which it will store in its EEPROM once all the encrypted portions have been decrypted.

Step 1009 checks if there are any other additional encrypted areas. In the example described in FIG. 3, there are three encrypted areas. The number of encrypted areas was a field in the example of FIG. 6. However, the number of portions can be determined using other conventional means. If there are additional encrypted portions, the process jumps to step 1005. If there are no additional encrypted portions, then the process continues with step 1011.

Step 1011 then loads the decrypted AU into the memory of the IC card. The ALU has passed all of the authentication and decryption checks and the application can now properly reside on the IC card and be executed and used by the card user. While the different checks have been presented in a particular order in FIGS. 9 and 10, the checks can be performed in any order. While all of the described techniques used in conjunction with the ALU provide the best security, one or more of the individual techniques could be used for their individual purposes or combined with other conventional security techniques.

Figure 11:
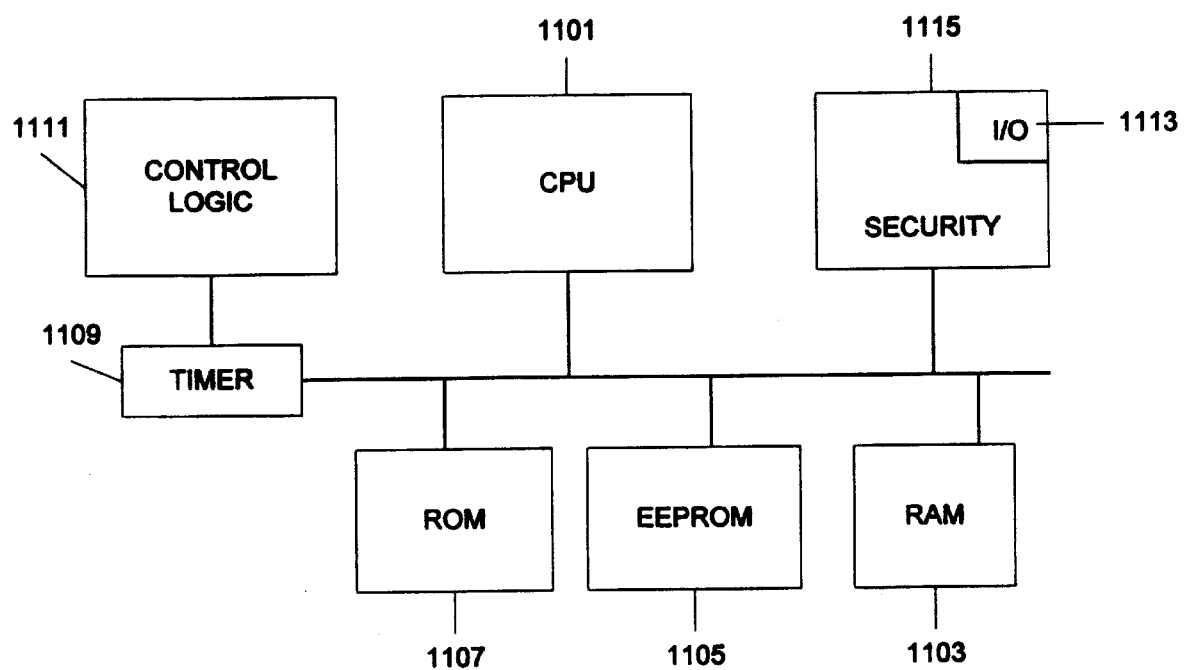
FIG. 11 is a block diagram showing the components of an IC card which can receive and process and Application Load Unit.

FIG. 11 shows an example of a block diagram of an IC card chip upon which an ALU can be loaded and processed.

An integrated circuit is located on an IC card for use. The IC card preferably includes a central processing unit 1101, a RAM 1103, an EEPROM 1105, a ROM 1107, a timer 1109, control logic 1111, an I/O port 1113 and security circuitry 1115, which are connected together by a conventional data bus.

Control logic 1111 in memory cards provides sufficient sequencing and switching to handle read-write access to the card's memory through the input/output ports. CPU 1101 with its control logic can perform calculations, access memory locations, modify memory contents, and manage input/output ports. Some cards have a coprocessor for handling complex computations like cryptographic operations. Input/output ports 1113 are used under the control of a CPU and control logic, for communications between the card and a card interface device. Timer 1109 (which generates or provides a clock pulse) drives the control logic 1111 and CPU 1101 through the sequence of steps that accomplish memory access, memory reading or writing, processing, and data communication. A timer may be used to provide application features such as call duration. Security circuitry 1115 includes fusible links that connect the input/output lines to internal circuitry as required for testing during manufacture, but which are destroyed ("blown") upon completion of testing to prevent later access. The AU data after the ALU has been authenticated and verified is stored in EEPROM 1105. The IC card private key will be stored in a secure memory location. The IC card public key and public key certificate is preferably stored in EEPROM 1105. The authentication process as described herein is performed by the CPU 1101.

FIG. 11 also shows a possible configuration for the application provider, transmitting entity and for the CA. CPU 1101 present in the application provider encrypts the necessary information using encryption techniques described herein and performs the necessary data operations. CPU 1101 present in the certification authority is used to sign the Application Load Certificate and the public key certificate as described herein.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

For example, while loading an application is discussed herein, the same secure loading processes can apply to transmitting other types of data such as data blocks, database files, word processing documents or any other type of data need to be transmitted in a secure manner.

We claim:

1. A method for securely transporting an application onto an integrated circuit card subsequent to issuance of said card by using an individualized key set for said card, comprising the steps of:

storing a private key and public key pair unique to said integrated circuit card in said memory located on said integrated circuit card;

retrieving said stored public key from said integrated circuit card;

encrypting at least a portion of said application to be transported onto said card, using said retrieved public key;

transmitting said encrypted portion to said integrated circuit card; and decrypting said encrypted portion using said integrated circuit card's private key to recover said transported portion.

2. The method of claim 1, further including the step of storing said decrypted portion on said integrated circuit card.

3. The method of claim 1, wherein a certification authority digitally signs said integrated circuit card's public key to produce a public key certificate unique to said card and stored thereon, and wherein said public key certificate is verified prior to said transmitting step.

4. The method of claim 3, wherein said public key certificate is verified with said certification authority's stored public key prior to said transmitting steps.

5. The method of claim 4, wherein said retrieved public key certificate is recovered and compared with said stored public key.

6. The method of claim 5, wherein said integrated circuit card's public and private keys are provided using an asymmetric technique.

7. The method of claim 6, wherein said asymmetric technique is RSA.

8. A method performed by an integrated circuit card for processing after issuance of said card incoming transmission of an application to said integrated circuit card by using an individualized key set for the card, comprising the steps of:

receiving said transmission comprising a portion of an application encrypted with a public key stored on said integrated circuit card, said public key forming part of said individualized key set;

retrieving a unique private key for said integrated circuit card which is part of said individualized key set; and decrypting said encrypted portion with said unique private key to recover said portion.

9. The method of claim 8, further including the step of storing said decrypted portion on said integrated circuit card.

10. The method of claim 8, wherein said individualized key set is generated by asymmetric encryption.

11. The method of claim 8, wherein a certification authority digitally signs said integrated circuit card's public key to produce a public key certificate unique to said card and stored thereon, and wherein said public key certificate is verified prior to said transmitting step.

12. The method of claim 11, wherein said public key certificate is retrieved prior to said transmitting steps.

13. The method of claim 12, wherein said retrieved public key certificate is verified using said certification authority's stored public key.

14. An apparatus located on an integrated circuit card by using an individualized key set for said card for processing after the issuance of said card an incoming secure application transmission comprising:

means for receiving said application transmission comprising a portion of said application encrypted with a public key stored on said integrated circuit card, said public key forming part of said individualized key set;

means for retrieving a unique public key for said integrated circuit card which is part of said individualized key set; and means for decrypting said encrypted portion with said unique private key to recover said portion.

15. The apparatus of claim 14, further comprising means for storing said portion on said integrated circuit card.

16. The apparatus of claim 14, further including means for retrieving a public key certificate which is generated by a certificate authority digitally signing said unique public key.

17. The apparatus of claim 16, further including means for transmitting said public key certificate prior to said receiving means receiving.

18. The apparatus of claim 17, wherein said transmitted public key certificate is verified using said certification authority's stored public key.

19. A method of securely transporting data onto an integrated circuit card by using an individualized key set for the card, comprising the steps of:

providing a first unique private and public key pair for a certification authority;

storing a second unique private and public key pair which form said individualized key set for said integrated circuit card in a memory located on said integrated circuit card;

encrypting said second public key with said first certification authority's private key to form a public key certificate;

storing said public key certificate on said integrated circuit card;

retrieving said stored public key certificate from said integrated circuit card;

verifying said public key certificate with said first public key to ensure that said public key certificate is valid;

encrypting at least a portion of said data using said retrieved second public key;

transporting said encrypted data to said integrated circuit card; and decrypting said encrypted data using said second private key to retrieve said data.

20. The method of claim 19, wherein said data comprises an application.

* * * * *

UNITED STATES PATENT AND TRADEMARK OFFICE
CERTIFICATE OF CORRECTION

PATENT NO.   : 6,230,267 B1
DATED        : May 8, 2001
INVENTOR(S)  : Richards et al.

It is certified that error appears in the above-identified patent and that said Letters Patent is hereby corrected as shown below:

<u>Title page,</u>
Item [56], References Cited, U.S. DOCUMENTS insert

| | | | |
|---|---|---|---|
| -- | 4,214,230 | Fak et al. | 07/22/80 |
| | 4,218,585 | Hellman et al. | 08/19/80 |
| | 4,259,720 | Campbell | 03/31/81 |
| | 4,302,810 | Bouricius et al. | 11/24/81 |
| | 4,305,059 | Benton | 12/08/81 |
| | 4,321,672 | Braun et al. | 03/23/82 |
| | 4,341,951 | Benton | 07/27/82 |
| | 4,405,829 | Rivest et al. | 09/20/83 |
| | 4,408,203 | Campbell | 10/04/83 |
| | 4,423,287 | Zeidler | 12/27/83 |
| | 4,442,345 | Mollier et al. | 04/10/84 |
| | 4,453,074 | Weinstein | 06/05/84 |
| | 4,467,139 | Mollier | 08/21/84 |
| | 4,498,000 | Decavele et al. | 02/05/85 |
| | 4,536,647 | Atalla et al. | 08/20/85 |
| | 4,578,530 | Zeidler | 03/25/86 |
| | 4,605,820 | Campbell, Jr. | 08/12/86 |
| | 4,630,201 | White | 12/16/86 |
| | 4,629,872 | Hällberg | 12/16/86 |
| | 4,650,978 | Hudson et al. | 03/17/87 |
| | 4,669,596 | Capers et al. | 06/02/87 |
| | 4,705,211 | Honda et al. | 11/10/87 |
| | 4,709,136 | Watanabe | 11/24/87 |
| | 4,709,137 | Yoshida | 11/24/87 |
| | 4,727,243 | Savar | 02/23/88 |
| | 4,727,244 | Nakano et al. | 02/23/88 |
| | 4,731,842 | Smith | 03/15/88 |
| | 4,734,568 | Watanabe | 03/29/88 |
| | 4,736,094 | Yoshida | 04/05/88 |
| | 4,742,215 | Daughters et al. | 05/03/88 |
| | 4,745,267 | Davis et al. | 05/17/88 |
| | 4,746,788 | Kawana | 05/24/88 |
| | 4,748,557 | Tamada et al. | 05/31/88 |
| | 4,748,668 | Shamir et al. | 05/31/88 |
| | 4,752,677 | Nakano et al. | 06/21/88 |
| | 4,757,185 | Onishi | 07/12/88 |
| | 4,757,543 | Tamada et al. | 07/12/88 |
| | 4,759,063 | Chaum | 07/19/88 |

UNITED STATES PATENT AND TRADEMARK OFFICE
CERTIFICATE OF CORRECTION

PATENT NO.    : 6,230,267 B1
DATED         : May 8, 2001
INVENTOR(S)   : Richards et al.

It is certified that error appears in the above-identified patent and that said Letters Patent is hereby corrected as shown below:

Title page (cont'd),

| | | |
|---|---|---|
| 4,759,064 | Chaum | 07/19/88 |
| 4,767,920 | Kitta et al. | 08/30/88 |
| 4,778,983 | Ushikubo | 10/18/88 |
| 4,785,166 | Kushima | 11/15/88 |
| 4,786,790 | Kruse et al. | 11/22/88 |
| 4,797,542 | Hara | 01/10/89 |
| 4,797,920 | Stein | 01/10/89 |
| 4,798,941 | Watanabe | 01/17/89 |
| 4,802,218 | Wright et al. | 01/31/89 |
| 4,803,347 | Sugahara et al. | 02/07/89 |
| 4,811,393 | Hazard | 03/07/89 |
| 4,816,653 | Anderl et al. | 03/28/89 |
| 4,816,654 | Anderl et al. | 03/28/89 |
| 4,825,052 | Chemin et al. | 04/25/89 |
| 4,831,245 | Ogasawara | 05/16/89 |
| 4,833,595 | Iijima | 05/23/89 |
| 4,839,504 | Nakano | 06/13/89 |
| 4,839,792 | Iijima | 01/13/89 |
| 4,849,614 | Watanabe et al. | 07/18/89 |
| 4,853,522 | Ogasawara | 08/01/89 |
| 4,853,961 | Pastor | 08/01/89 |
| 4,853,961 | Pastor | 08/01/89 |
| 4,874,935 | Younger | 10/17/89 |
| 4,877,945 | Fujisaki | 10/31/89 |
| 4,877,947 | Mori | 10/31/89 |
| 4,879,747 | Leighton et al. | 11/07/89 |
| 4,887,234 | Iijima | 12/12/89 |
| 4,891,503 | Jewell | 01/02/90 |
| 4,891,506 | Yoshimatsu | 01/02/90 |
| 4,900,904 | Wright et al. | 02/13/90 |
| 4,906,828 | Halpern | 03/06/90 |

UNITED STATES PATENT AND TRADEMARK OFFICE
CERTIFICATE OF CORRECTION

PATENT NO.    : 6,230,267 B1
DATED         : May 8, 2001
INVENTOR(S)   : Richards et al.

It is certified that error appears in the above-identified patent and that said Letters Patent is hereby corrected as shown below:

Title page (cont'd),

| | | |
|---|---|---|
| 4,907,270 | Hazard | 03/06/90 |
| 4,926,480 | Chaum | 05/15/90 |
| 4,935,962 | Austin | 06/19/90 |
| 4,961,142 | Elliott et al. | 10/02/90 |
| 4,969,188 | Schöbi | 11/06/90 |
| 4,977,595 | Ohta et al. | 12/11/90 |
| 4,984,270 | LaBounty | 01/08/91 |
| 4,985,615 | Iijima | 01/15/91 |
| 4,987,593 | Chaum | 01/22/91 |
| 4,993,068 | Piosenka et al. | 02/12/91 |
| 4,995,081 | Leighton et al. | 02/19/91 |
| 4,996,711 | Chaum | 02/26/91 |
| 5,001,753 | Davio et al. | 03/19/91 |
| 5,003,594 | Shinagawa | 03/26/91 |
| 5,005,200 | Fischer | 04/02/91 |
| 5,010,239 | Mita | 04/23/91 |
| 5,012,074 | Masada | 04/30/91 |
| 5,012,076 | Yoshida | 04/30/91 |
| 5,016,274 | Micali et al. | 05/14/91 |
| 5,038,025 | Kodera | 08/06/91 |
| 5,068,894 | Hoppe | 11/26/91 |
| 5,093,862 | Scwartz | 03/03/92 |
| 5,097,115 | Ogasawara et al. | 03/17/92 |
| 5,120,939 | Claus et al. | 06/09/92 |
| 5,128,997 | Pailles et al. | 07/07/92 |
| 5,131,038 | Puhl et al. | 07/14/92 |
| 5,142,578 | Matyas et al. | 08/25/92 |
| 5,146,499 | Geffrotin | 09/08/92 |
| 5,148,481 | Abraham et al. | 09/15/92 |
| 5,161,231 | Iijima | 11/03/92 |
| 5,163,098 | Dahbura | 11/10/92 |
| 5,164,988 | Matyas et al. | 11/17/92 |
| 5,165,043 | Miyahara et al. | 11/17/92 |

UNITED STATES PATENT AND TRADEMARK OFFICE
CERTIFICATE OF CORRECTION

PATENT NO. : 6,230,267 B1
DATED : May 8, 2001
INVENTOR(S) : Richards et al.

It is certified that error appears in the above-identified patent and that said Letters Patent is hereby corrected as shown below:

Title page (cont'd),

| | | |
|---|---|---|
| 5,166,503 | Mizuta | 11/24/92 |
| 5,175,416 | Mansvelt et al. | 12/29/92 |
| 5,180,901 | Hiramatsu | 01/19/93 |
| 5,191,193 | Le Roux | 03/02/93 |
| 5,191,608 | Geronimi | 03/02/93 |
| 5,200,999 | Matyas et al. | 04/06/93 |
| 5,201,000 | Matyas et al. | 04/06/93 |
| 5,202,922 | Iijima | 04/13/93 |
| 5,214,702 | Fischer | 05/25/93 |
| 5,224,162 | Okamoto et al. | 06/29/93 |
| 5,243,175 | Kato | 09/07/93 |
| 5,247,578 | Pailles et al. | 09/21/93 |
| 5,371,797 | Bocinsky, Jr. | 12/06/94 |
| 5,420,405 | Chasek | 05/30/95 |
| 5,473,690 | Grimonprez et al. | 12/05/95 |
| 5,485,520 | Chaum et al. | 01/16/96 |
| 5,511,121 | Yacobi | 04/23/96 |
| 5,517,011 | Vandenengel | 05/14/96 |
| 5,530,232 | Taylor | 06/25/96 |
| 5,534,857 | Laing et al. | 07/09/96 |
| 5,539,825 | Akiyama et al. | 07/23/96 |
| 5,542,081 | Geronimi | 07/30/96 |
| 5,544,246 | Mandelbaum et al. | 08/06/96 |
| 5,546,523 | Gatto | 08/13/96 |
| 5,557,516 | Hogan | 09/17/96 |
| 5,574,269 | Mori et al. | 11/12/96 |
| 5,578,808 | Taylor | 11/26/96 |
| 5,692,132 | Hogan | 11/25/97 |
| 5,699,528 | Hogan | 12/16/97 |
| 5,704,046 | Hogan | 12/30/97 |
| 5,705,798 | Tarbox | 01/06/98 |
| 5,708,780 | Levergood et al. | 01/13/98 |
| 5,715,314 | Payne et al. | 02/03/98 |
| 5,724,424 | Gifford | 03/03/98 – |

UNITED STATES PATENT AND TRADEMARK OFFICE
CERTIFICATE OF CORRECTION

PATENT NO.    : 6,230,267 B1
DATED         : May 8, 2001
INVENTOR(S)   : Richards et al.

It is certified that error appears in the above-identified patent and that said Letters Patent is hereby corrected as shown below:

<u>Title page (cont'd)</u>
FOREIGN PATENT DOCUMENTS, insert:

|     |             |           |        |
|-----|-------------|-----------|--------|
| --  | 2,667,171   | 1992      | (FR)   |
|     | 0,686,947   | 1995      | (EP)   |
|     | WO 9116691  | 10/31/91  | (WO) – |

OTHER PUBLICATIONS, insert:

-- Davies et al., "Security for Computer Networks: An Introduction to Data Security in Teleporcessing and Electronic Funds Transfer," John Wiley & Sons 1984. --

Signed and Sealed this

Twenty-second Day of July, 2003

JAMES E. ROGAN
*Director of the United States Patent and Trademark Office*